(12) United States Patent
Russo

(10) Patent No.: US 8,533,629 B2
(45) Date of Patent: *Sep. 10, 2013

(54) AREA SELECTABLE MENUS

(75) Inventor: Thomas P. Russo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/628,139

(22) Filed: Nov. 30, 2009

(65) Prior Publication Data

US 2010/0077354 A1 Mar. 25, 2010

Related U.S. Application Data

(63) Continuation of application No. 11/340,492, filed on Jan. 27, 2006, now Pat. No. 7,644,372.

(51) Int. Cl.
*G06F 3/048* (2013.01)

(52) U.S. Cl.
USPC .......................... 715/834; 715/811; 715/815

(58) Field of Classification Search
USPC .................. 715/764, 810, 811, 815, 834, 863
See application file for complete search history.

(56) References Cited

U.S. PATENT DOCUMENTS

| | | | | |
|---|---|---|---|---|
| 5,500,935 A | * | 3/1996 | Moran et al. | 715/863 |
| 5,524,196 A | * | 6/1996 | Blades | 715/834 |
| 5,559,944 A | * | 9/1996 | Ono | 715/841 |
| 5,596,699 A | | 1/1997 | Driskell | |
| 5,689,667 A | * | 11/1997 | Kurtenbach | 715/810 |
| 5,701,424 A | * | 12/1997 | Atkinson | 715/808 |
| 5,721,853 A | | 2/1998 | Smith | |
| 5,745,717 A | | 4/1998 | Vayda et al. | |
| 5,790,820 A | | 8/1998 | Vayda et al. | |
| 5,943,039 A | * | 8/1999 | Anderson et al. | 715/810 |
| 6,249,606 B1 | | 6/2001 | Kiraly et al. | |
| 6,337,698 B1 | * | 1/2002 | Keely et al. | 715/823 |
| 6,549,219 B2 | * | 4/2003 | Selker | 715/834 |
| 6,618,063 B1 | | 9/2003 | Kurtenbach | |
| 7,046,248 B1 | * | 5/2006 | Perttunen | 345/440 |

(Continued)

OTHER PUBLICATIONS

Kurtenbach, et al., "The Limits of Expert Performance Using Hierarchic Marking Menus", retrieved at <<http://www.dgp.toronto.edu/-gordo/papers/CH193_MM_Expert.pdf>>, 1993, 7 pages.

(Continued)

*Primary Examiner* — Phenuel Salomon
(74) *Attorney, Agent, or Firm* — Lee & Hayes, PLLC

(57) ABSTRACT

System and method of adjusting selection areas of menu options in a menu utilize the frequency of selection of each of the menu options to adjust the size of various selection areas over time. The sizes of menu options or selection areas with relatively high frequency of use may increase, while the sizes of the selection areas of the remaining menu options may decrease. In addition, the size of the menu options may be further adjusted to return to the original arrangement, e.g., in which the size of each of the selection areas is equal or occupies some predetermined area. The user may hold an electronic pen over the menu or select an icon from the menu to resize the selection areas to return to the original arrangement.

17 Claims, 9 Drawing Sheets

(56) References Cited

U.S. PATENT DOCUMENTS

| | | |
|---|---|---|
| 2001/0045965 A1 | 11/2001 | Orbanes et al. |
| 2004/0179659 A1* | 9/2004 | Byrne et al. ............... 379/88.18 |
| 2004/0221243 A1 | 11/2004 | Twerdahl et al. |
| 2004/0250217 A1* | 12/2004 | Tojo et al. .................... 715/810 |
| 2005/0034081 A1 | 2/2005 | Yamamoto et al. |
| 2006/0095864 A1* | 5/2006 | Mock et al. .................. 715/810 |

OTHER PUBLICATIONS

Kurtenbach, et al., "User Learning and Performance with Marking Menus", retrieved at <<http://www.dgp.toronto.edu/-gordo/papers/CH194_UserLearn.pdf>>, 1993, 7 pages.

Oka, et al., "Real-Time Fingertip Tracking and Gesture Recognition", IEEE Computer Graphics and Applications, vol. 22, Issue 6, Nov. 2002, pp. 64-71.

\* cited by examiner

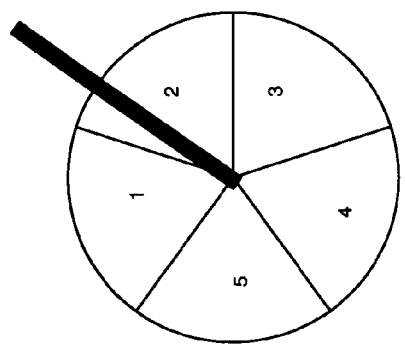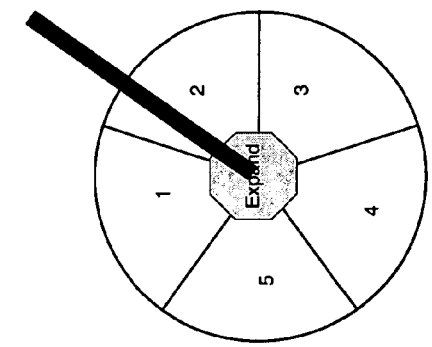
Figure 6A → Figure 6B
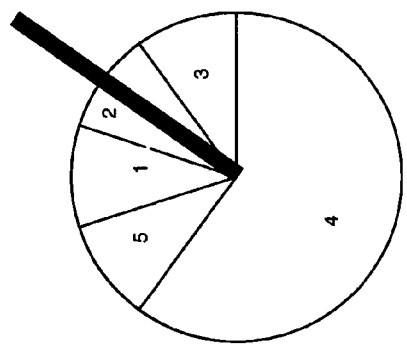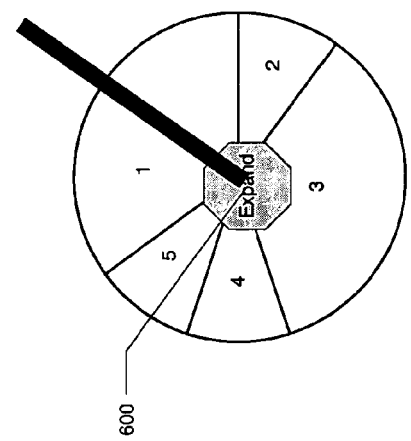
Figure 7A → Figure 7B

AREA SELECTABLE MENUS

RELATED APPLICATIONS

This U.S. Non-provisional application for Letters Patent is a continuation of and claims the benefit of priority to U.S. patent application Ser. No. 11/340,492, filed on Jan. 27, 2006, the disclosure of which is incorporated by reference herein.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the WINDOWS® computer operating system (available from Microsoft Corporation of Redmond, Wash.). The ubiquitous keyboard and mouse interface provides for fast creation and modification of documents, spreadsheets, database fields, drawings, photos, webpages, and the like.

Recently, however, pen-based computing systems, such as tablet PCs, personal digital assistants, and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

Radial menus, as used with user interfaces on a desktop or laptop computer system, are increasingly being used with these pen based computing systems. Radial menus allow menu options to be selected using a pointing device, such as a mouse or electronic pen, from a circular display of options that may, upon activation, appear anywhere within the user interface. As the number of menu items within the radial menu increases, the size of each menu option selection area decreases. The small selection area of menu options may lead to erroneous menu selections. Improved sizing of menu option selection areas would benefit users of these menu interfaces.

SUMMARY

The present invention relates to methods of adjusting the size of the selection area of menu options in a menu. As a menu option is chosen, the frequency of that selection being made is stored within the computing device. This frequency information may be used to adjust the size of the selection areas of the menu options. As a menu option is chosen more frequently, the size of the selection area of that menu option will increase, while the size of the selection area of the remaining options will decrease or be removed from the initial menu display.

In another aspect of the present invention, the size of the selection area of the menu options may be returned to the original arrangement. For example, the user may select an icon within the menu, hold the stylus over the menu, or wait a predetermined time period without making a selection to return the menu to its original arrangement.

BRIEF DESCRIPTION OF THE DRAWINGS

The present invention is illustrated by way of example and not limited in the accompanying figures in which like reference numerals indicate similar elements and in which:

FIGS. 6A-6B depict a method of resizing the menu options;

FIGS. 7A-7B depict another method of resizing the menu options; and

DETAILED DESCRIPTION

The present invention is directed to interface elements of a pen based, notepad or notebook computer, however aspects of the present invention may also be used with desktop or laptop computer systems.

Figure 1:
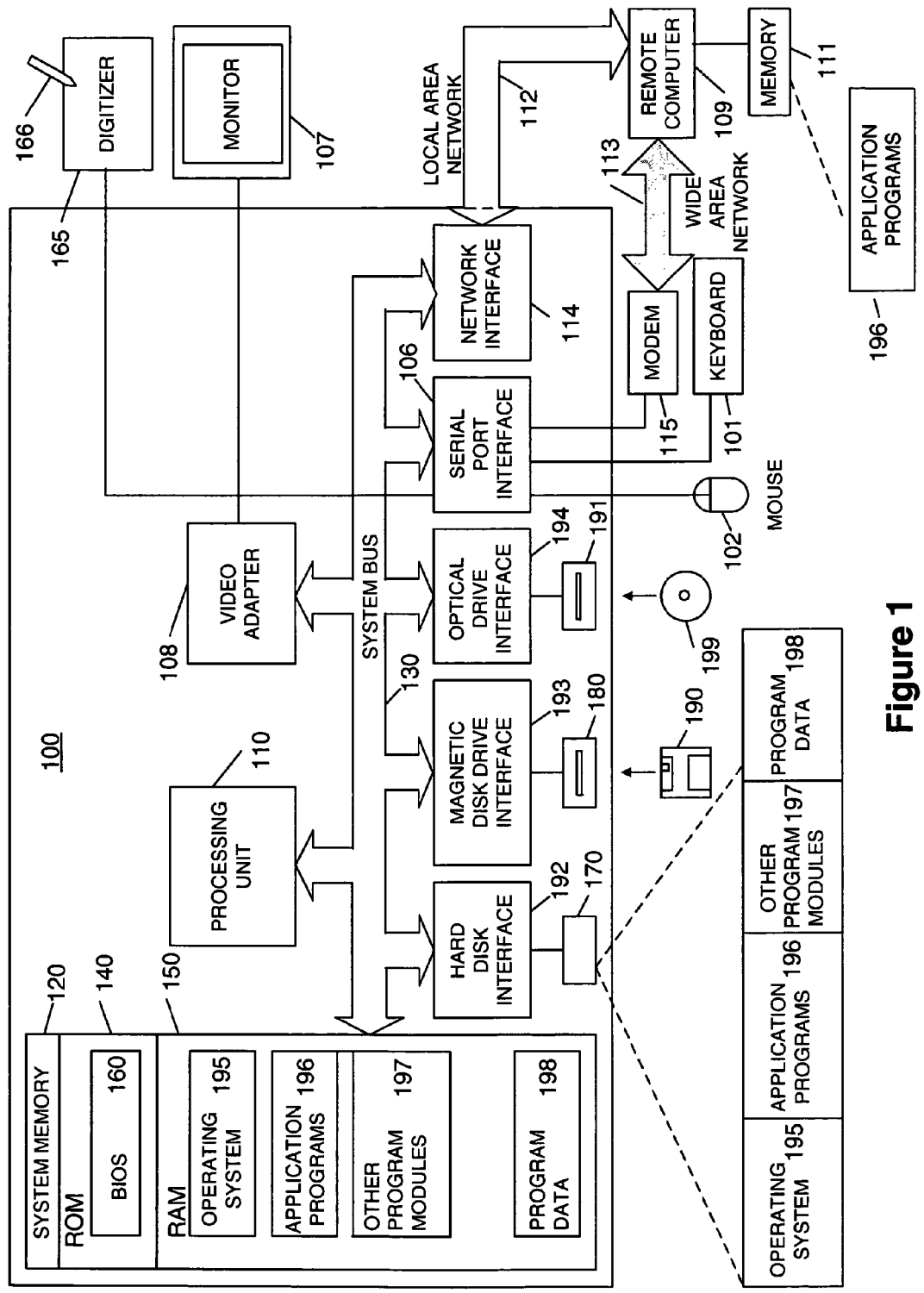
FIG. 1 is a schematic diagram of a personal computing environment in which aspects of this invention may be practiced.

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill. Additional elements, devices, or subsystems may be included in the computer system without departing from this invention.

When utilized with the present invention, a notebook or notepad computer may include a liquid crystal display, with a display area of a size and shape approximating a piece of paper. The border of a writing surface or the "paper" may be slightly inset from one or more edges of the display area, so that there is a display region around the edge of the paper where tools or status indicators can be partially or fully displayed.

One attribute of an interface to a pen-based computing system relates to the combination of spatial and/or gestural cues by which the system deduces how the input should be processed. In the present invention, pen actions may be used to select elements of the page or make selections within a menu appearing on the page.

Figure 2:
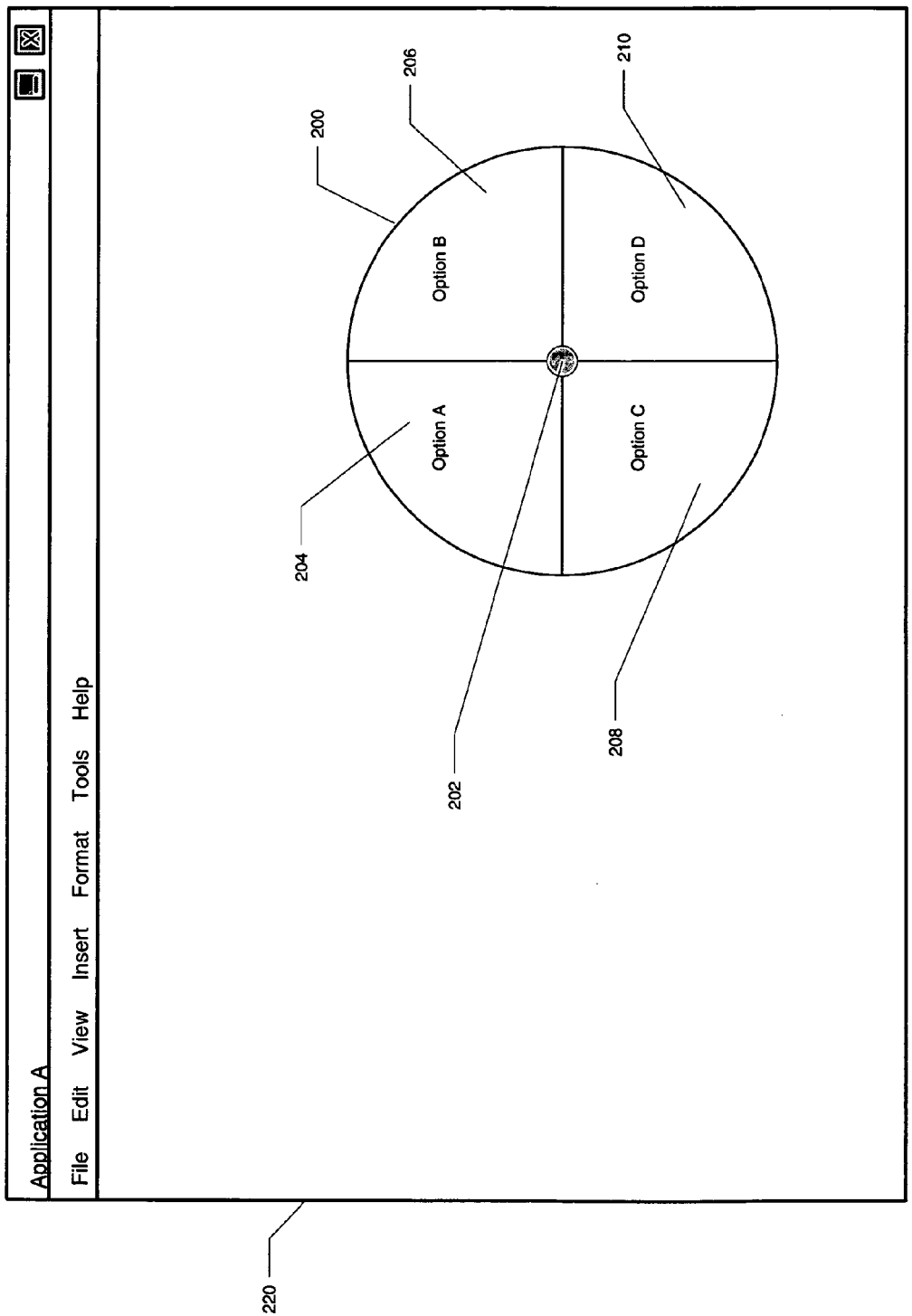
FIG. 2 depicts an example of a radial menu as it may appear on a user interface.

One of the types of tools available in at least some of the user interfaces is commonly called a "radial menu." As shown in FIG. 2, a radial menu 200 may be a circular or semi-circular menu (or otherwise shaped) made of several "pie slices" around a typically inactive center 202. The selection areas may appear as a "pie slice" or as an icon within the "pie slice" area. In such a menu 200 the selection of the menu item is governed by the direction of a stroke across the display generally from a starting point in a vicinity where the icon is located. As shown in FIG. 2, this menu 200 may appear near a right hand side of the display 220 but it could be located near the left, top or bottom or other positions within the display 220 as well.

The menu 200 may be activated in several ways. In a first mode switch, a selection may be started implicitly by pen location. For instance, the menu 200 may be activated (e.g., made to appear on the display 220) whenever the pen is held near a displayed element which is known or set by the system to support selection. In a second mode switch, a selection may be activated implicitly by moving the pen to a selection orientation. For instance, the menu 200 may be activated whenever the pen is pointed toward the bottom of the page. In a third mode switch, a selection may be started explicitly by tapping a select icon, then stopped only by tapping the select icon while in select mode, in which case the current selection may be released. Of course, other ways of activating the menu 200 may be provided without departing from the invention. Additionally, if desired, multiple ways of activating the menu 200 may be provided in a single system.

After the menu 200 is activated by e.g., one of the techniques discussed above, if a stroke, or tap, by the input pen is made to one of the menu options, the menu option is selected. Such radial menu may be laid out according to the handedness of the user, and it may be positioned near the edge of the display region, corresponding to the handedness particularly at the edge of the display. The layout and position for visibility in relation to the hand may be controlled such that the user's hand does not block the user's view of the selections. In particular, the items in a radial menu may be positioned for visibility in relation to the hand, and radially for use with simple pen strokes, which in combination with cursor-less, direct use of the pen, fully maximizes the user's ability to discover and use gestures. Choices may be displayed radially from the location where the pen tip first touches down, typically in a quantity of five or less such that each has an easily distinguishable compass direction, and each is plainly visible while a pen and hand are interacting with the menu.

With further reference to FIG. 2, upon activation of the menu 200 on a user interface 220, all menu selection areas may be equal in size. A radial menu 200, as shown in this example, may include four possible menu options 204, 206, 208, 210, and the area of each option may be an equal 25% of the radial menu. The menu options 204, 206, 208, 210 may be labeled with a variety of commands depending on the type of menu. For instance, the options may include commands such as cut, copy, paste, paste special, and the like. The options may also appear in differing colors, with different color backgrounds, text fonts, with icons, etc. In using the above example, the option for "cut" may appear on a blue background, the option for "copy" may appear on a red background, the option for "paste" may appear on a green background, the option for "paste special" may appear on a yellow background, etc.

As the menu 200 is activated and used, the option selected each time the user activates the menu 200 may be stored. This may be done internally within the notebook computer, e.g., by the operating system, the application program, etc. The storage of the selections allows the system to determine the frequency with which each selection is made. For instance, a user may activate a given radial menu several times throughout the day. The user may choose menu option B 206, as seen in FIG. 2, more often than he or she chooses options A 204, option C 208 or option D 210. The computer system may store this frequency information and maintain and track this data as user interaction with the menu 220 continues.

Figure 3:
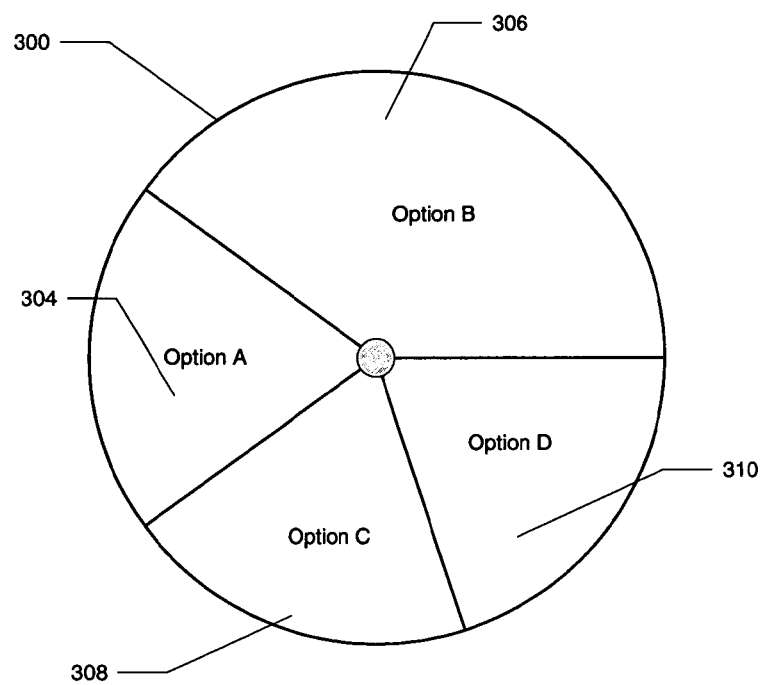
FIG. 3 depicts an example of a radial menu with menu options resized based on frequency of menu option selections.

With the frequency information available, the size of the selection area within the radial menu may be adjusted to better accommodate the user's typical selections, in response to the frequency information stored. For instance, as the user in the above example continues to select option B 206 more often than the other available options, the appearance of the menu 200 will adjust to provide a greater area in which option B may be chosen. FIG. 3 shows the selection area of option B 306 of the activated menu 300 as a much larger area than menu option A 304, option C 308 or option D 310. This increase in area is due to the frequent selection of option B by the user over time.

Accordingly, as option B 306 is chosen more often than the other possible selections, the selections used with less frequency will become smaller in area, thereby taking up less available space within the menu. As in FIG. 3, the selection areas of options A 304, C 308 and D 310 area smaller than the equal portion of the menu each area shared in FIG. 2.

The sizes of the menu options may continue to adjust over time based on frequency of use. However, the size of the areas may be limited by a predetermined percentage to ensure each menu option remains large enough to be available to the user. For instance, the menu options may have a predetermined minimum size of 5% of the total available area to ensure that rarely used menu options may still be selected. In an alternative example, any menu option dropping below the 5% minimum may then be put into a submenu. The radial menu may then include a "more options" selection that would then activate the submenu including these rarely used menu options.

Accordingly, the menu options may have a predetermined maximum size of 70% of the total available area to ensure that sufficient space remains for the less frequently used menu options.

In addition, the menu sizing formula may also take into account icons that were more recently used, irrespective of their use frequency. For instance, a more recently used menu option may appear somewhat larger than if the sizing were based solely on frequency of use, at least for a predetermined number of cycles of display of the radial menu. In addition, there may be a minimum number of uses required before the sizing were adjusted. For example, a particular selection may be made a minimum of 10 times to adjust the size of the menu option.

The increased selection area for more frequently selected options will aid in ease of use of the radial menu. A larger selection area generally means that less precision is required when making a selection from the menu. Less required precision leads to fewer incorrect selections and improves user efficiency.

Figure 4:
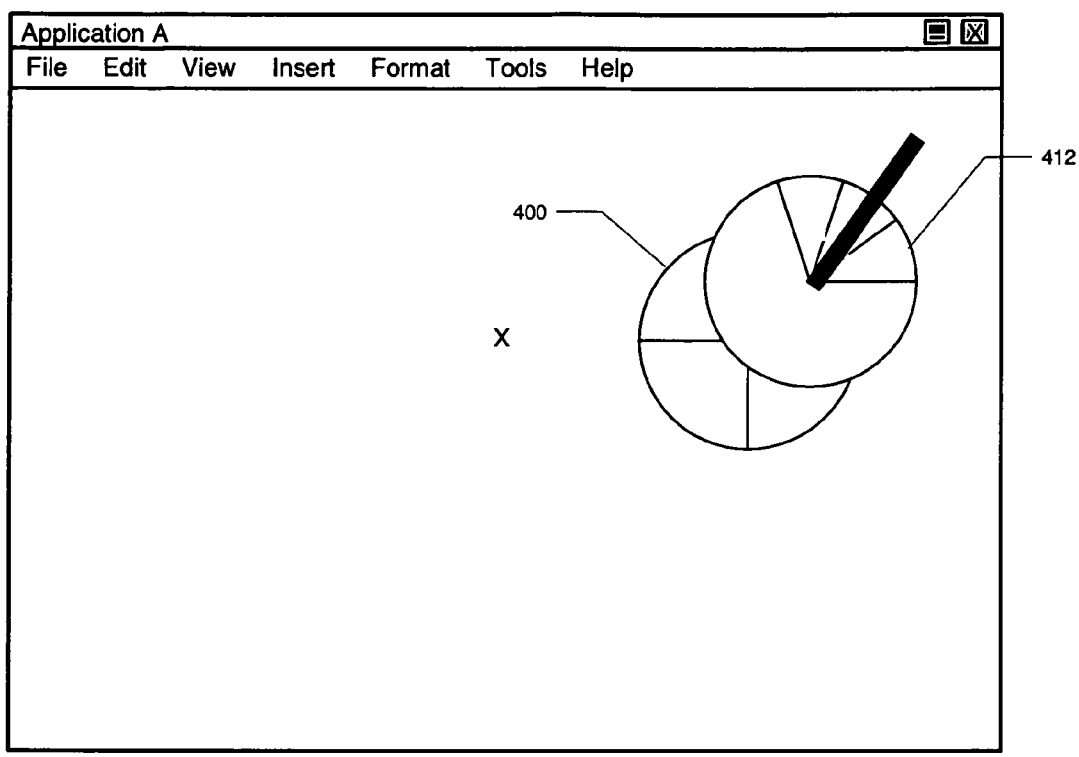
FIG. 4 depicts an example of a radial submenu with menu options resized based on frequency of menu option selection.

As shown in FIG. 4, radial menus 400 are often used with submenus 412 that may appear once a first selection is made from the initial radial menu 400 (e.g., in response to a tap and/or pen hover action). The submenu 412 may operate in a similar fashion to the primary radial popup menu 400. The selection area for each submenu 412 option may be adjusted for frequency of use, just as with the primary radial menu 400.

Figure 5A:
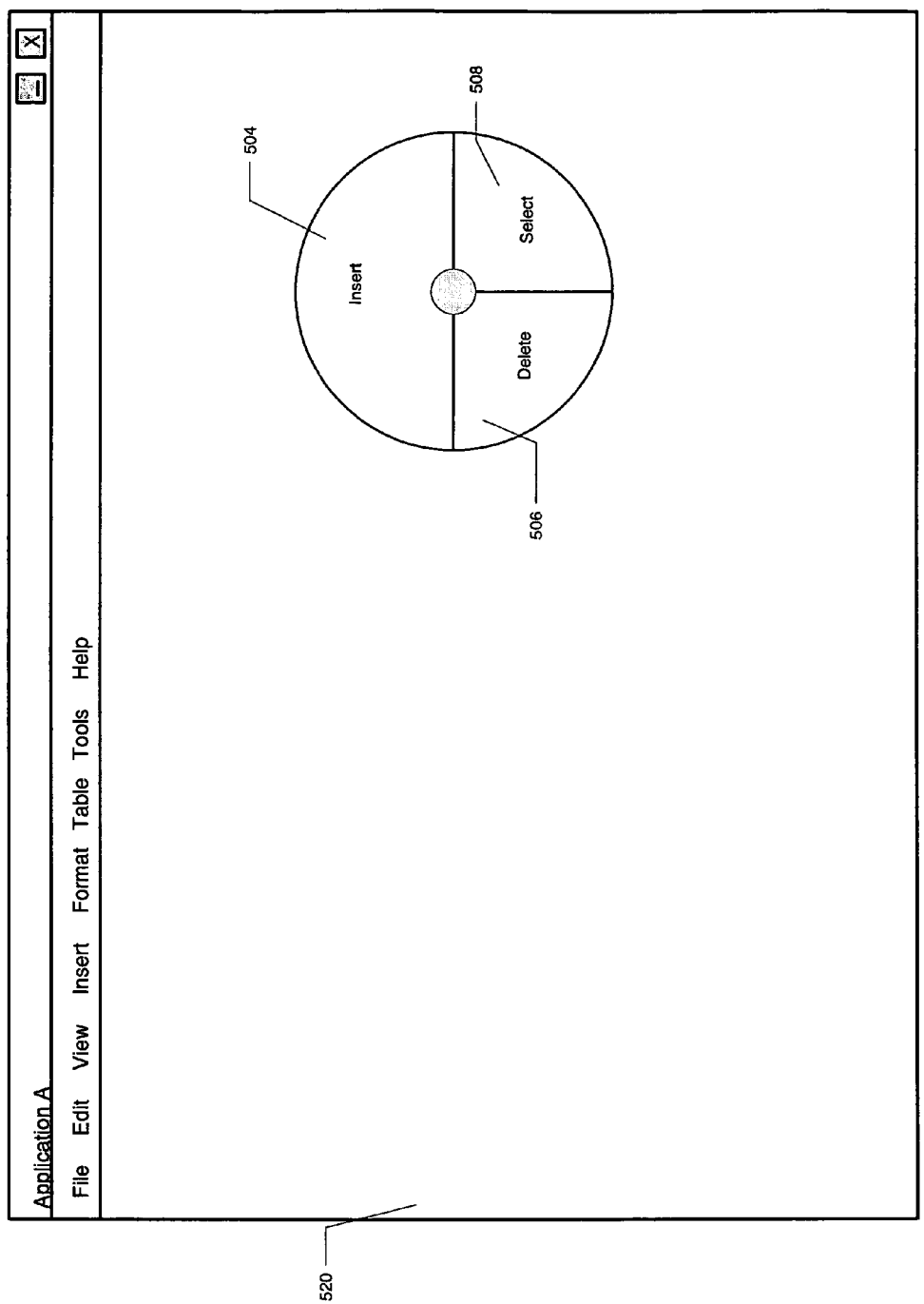
FIGS. 5A-5C depict the use of a pen gesture to make a menu selection from a menu in which selection areas are resized based on frequency of use.
Figure 5B:
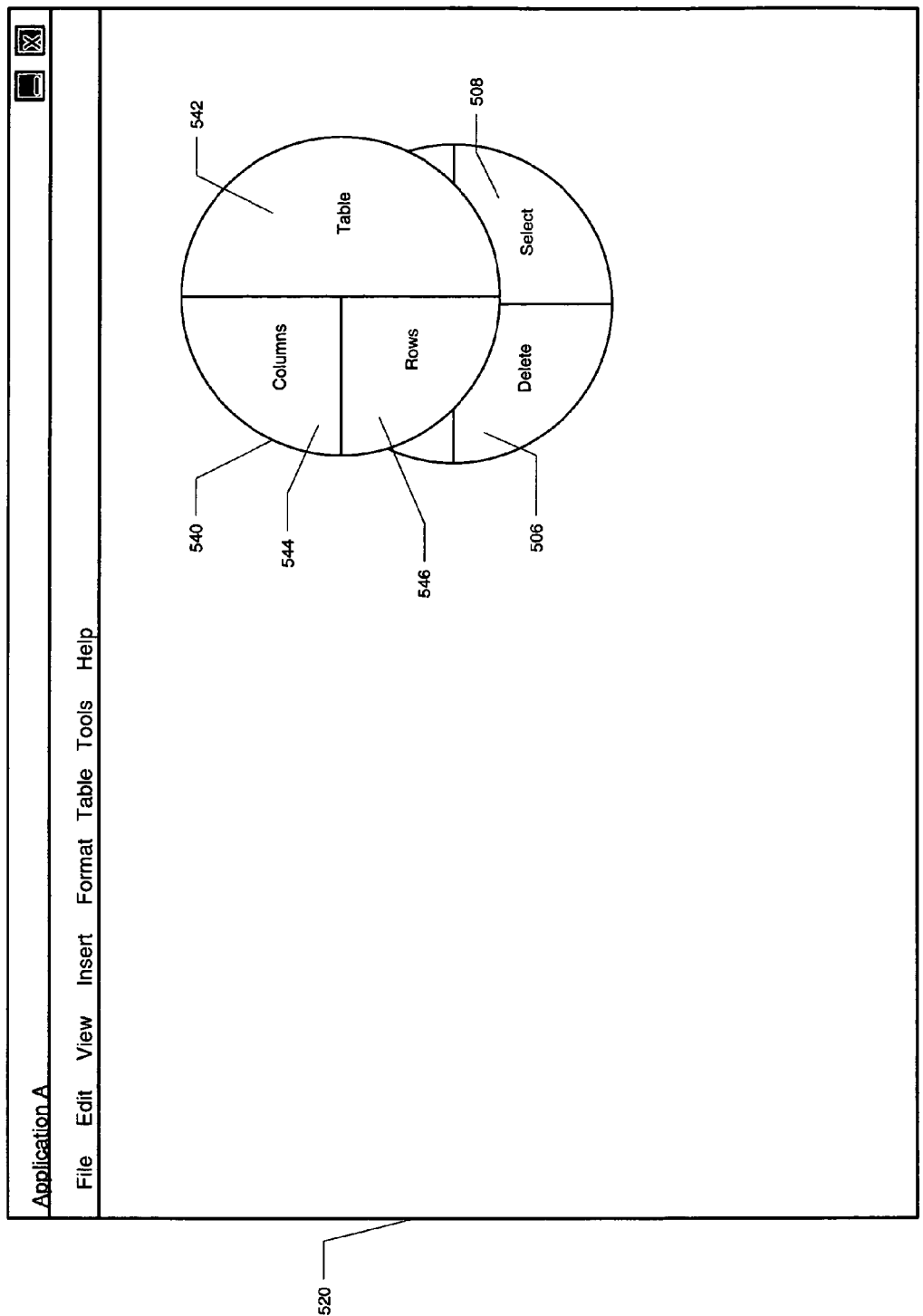
Figure 5C:
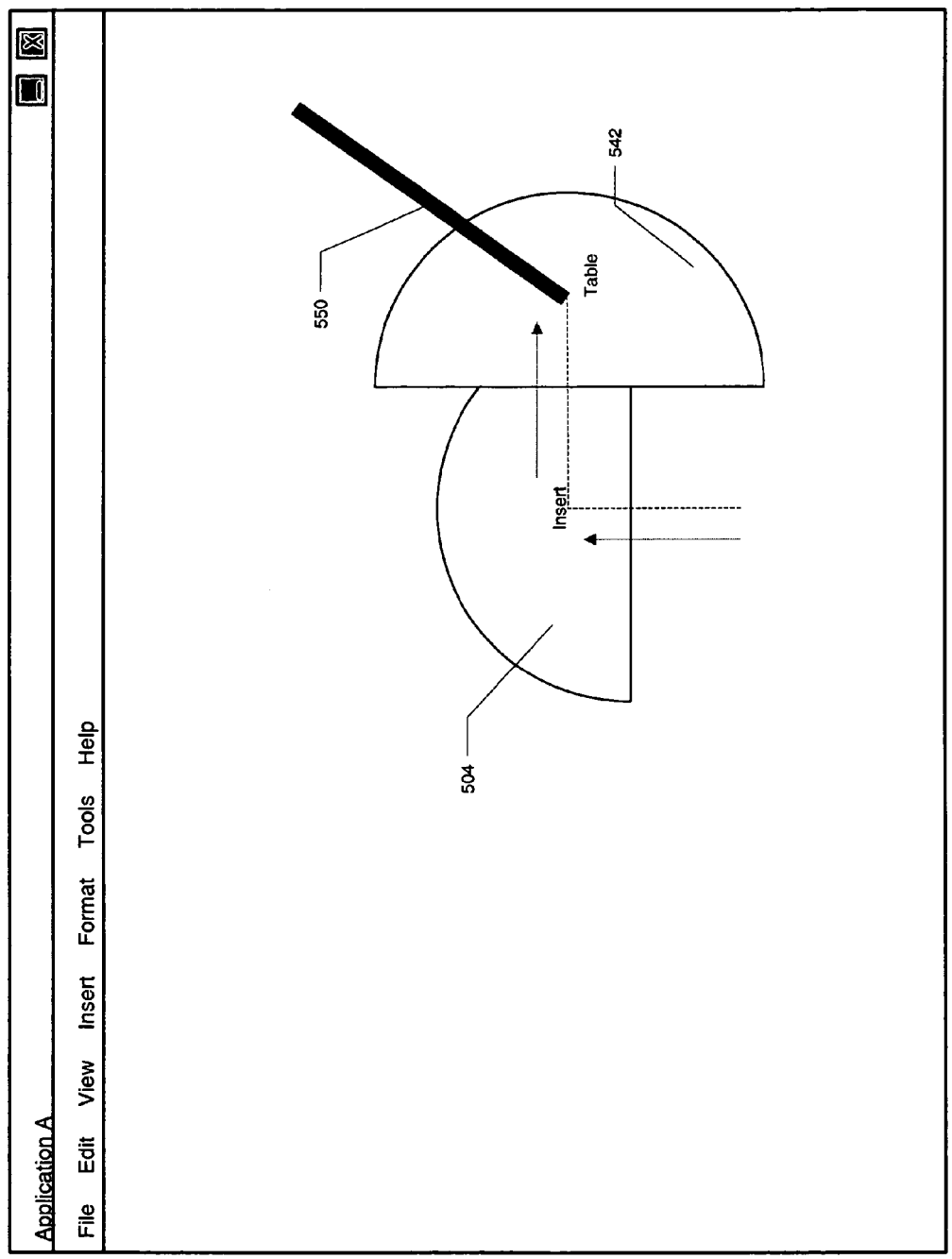

One advantage to the use of radial menus is the ease with which they may be manipulated. When used with a notebook type computer system, an electronic pen or stylus is likely to be used in making menu selections. The use of the pen, coupled with the radial menu, allows for gestures to be used when making selections. In one example, as seen in FIG. 5A, a user may wish to insert a table into the document being created. In order to insert a table in this example system, the user will activate the radial menu, as described above, for example by selecting an appropriate icon on the graphical user interface 520 (e.g., along the top toolbar, etc.) or other appropriate action. Selection of this icon activates a popup radial menu 500 with several menu options, including "insert," 504 "delete," 506 and "select" 508. The user may then drag or otherwise move the stylus straight up to select "insert" 504. As shown in FIG. 5B, this selection may activate a submenu 540, centered at the tip of the stylus and over the "insert" selection 504, which may include submenu options such as "table," 542 "columns," 544 or "rows" 546. To insert a table, the user may then drag the stylus directly to the right to select "table" 542. After repeated use of this sequence of commands, the user may recall that the simple gesture of dragging the stylus directly up then to the right will insert the table. FIG. 5C depicts the gesture of the present example. The pen 550 is dragged upward to select "insert" 504 and to the right to select "table" 542. A user then may rely on his recollection of the gesture needed to insert the table, rather than having to view each menu option and make a selection. The use of gestures such as this may improve the efficiency of the user.

An increase in the selection area for frequently chosen options, as shown in FIGS. 5A-5C, may simplify the use of gestures. The larger selection area for frequently used menu options requires less precision when making the gesture associated with an oft-used menu option. Requiring less precision to make a selection may lead to fewer erroneous selections and improved user efficiency.

Although the menu size may automatically adjust based on the frequency of the user's selections, if desired, systems and methods according to at least some examples of this invention may allow a user to selectively resize the selection areas of the radial menu to return to the original arrangement. For example, upon activation of the menu, the user may continue to hold the pen over the menu in a "hover action" without moving it to make a selection. The user may hold the pen over the menu for a preset time before the menu will automatically resize to the original arrangement (e.g., to an arrangement in which all potential selections are shown of equal or predetermined size, to an expanded arrangement to include additional potential selections, etc.).

FIGS. 6A and 6B illustrate one possible arrangement of this feature. In FIG. 6A, the user activates the popup radial menu by touching the stylus to the screen surface. The selection area of the various menu options may be initially adjusted in response to the previously stored frequency of the user's selections. Referring to FIG. 6A, the selection area for menu option 4 appears much larger than the selection area for menu options 1, 2, 3 or 5. As the user desires to return the radial menu to its original arrangement in which each selection area is equal, the user may hold the pen over the menu at or near the same position that initially activated the menu. The user may hold the pen in this "hover" position for a preset time period. When that preset time period is reached, the menu automatically may return to its original configuration in which each of the five selections areas are equal, as shown in FIG. 6B.

In one alternate arrangement shown in FIGS. 7A and 7B, the user may readjust the size of the selection areas by tapping an icon within the radial menu which is configured to adjust the size of the selection areas to be equal. For example, FIG. 7A illustrates a radial menu with an increased selection area for menu options 1 and 3. The normally inactive center of the radial menu may include an icon 600 configured to adjust the size of the selection areas to an equal area for each. By tapping the center icon 600 with the pen, the size of each selection area is readjusted to be equal to all others, as shown in FIG. 7B. If desired, this size readjustment selection icon 600 may be temporarily applied (e.g., to last just for that menu interaction cycle, to last for this specific document or application program), etc., and/or it may be used to reset the system (e.g., to begin collecting frequency data anew).

Figure 8:
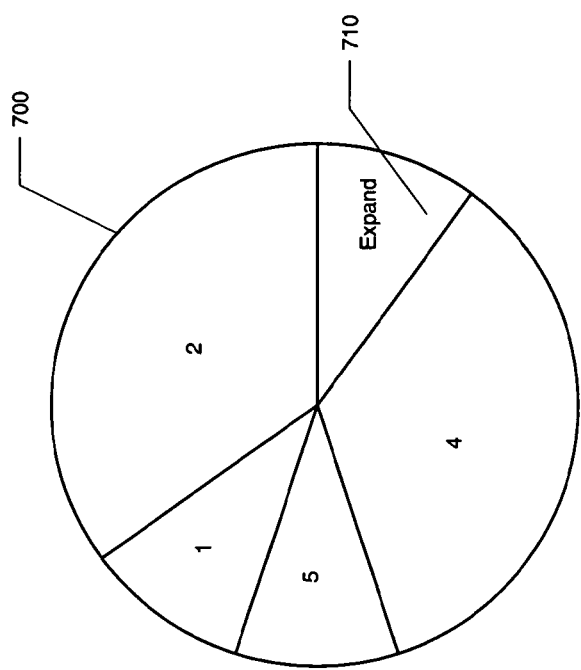
FIG. 8 depicts yet another method of resizing the menu options.

In yet another alternate example arrangement, as shown in FIG. 8, the expand button 710 may be one menu option within the radial menu 700. For instance, a radial menu may have five selections areas, one being "insert," another being "format," another being "tools," another being "edit," and another being "expand all." Tapping on the "expand all" icon 710, may be used, for example, to show additional menu items within the same menu (e.g., items used infrequently, etc.).

These resizing and menu expansion options may also be utilized on submenus as they popup from other radial menus. For instance, the user may activate the main radial menu then make a selection, thereby activating a radial submenu. The user may hold the pen over the submenu for the preset time and the selection areas of all menu options in the submenu may resize to be equal and/or the submenu size or content may increase to include additional, previously undisplayed menu options.

The techniques discussed may also be utilized to expand the radial menu to include additional menu options, including some not previously displayed. For instance, selecting an expand icon may not only resize the menu options to the original arrangement, additional menu options may appear as well. Accordingly, the expand action may also expand the overall size of the radial menu to ensure sufficient space for the additional menu options.

In addition, the radial menu may include more recently selected menu options prior to resizing to include additional menu options. For example, a menu option may appear in the initially displayed menu that has been recently used but may not have had high frequency of use. The recent selection of that menu option may cause it to appear in the radial menu when it wouldn't typically appear based on frequency of use alone. The menu may then be expanded to include additional menu options and the options may be resized.

Although the area frequency radial menu of the present invention has been described in the context of a notebook or notepad computer, the invention may also be implemented on a desktop or laptop computer. For instance, a pointing device, such as a mouse or a user's finger (with a touch screen), may be used to make selections on the radial menu. The frequency of the selection of each menu option may be stored, as discussed above, and used as a basis for resizing the selection area of each menu option.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A computing device comprising one or more processors configured with executable instructions to perform operations comprising:
   displaying, via a touch sensitive display of the computing device, a radially configured user interface comprising at least a first selection area and a second selection area;
   monitoring, at the computing device, a first frequency of personal use of the first selection area and a second frequency of personal use of the second selection area, the first frequency of personal use and the second frequency of personal use being based on menu selections provided by a user of the computing device via touch input;
   storing the first frequency of personal use and the second frequency of personal use;
   determining that the first frequency of personal use is greater than the second frequency of personal use;
   increasing a size of the first selection area based in part on the first frequency of personal use being greater than the second frequency of personal use, wherein the increasing adds selection space for the user to select the first selection area; and
   decreasing a size of the second selection area based in part on the first frequency of personal use being greater than the second frequency of personal use, wherein the decreasing removes selection space for the user to select the second selection area.

2. The computing device of claim 1, wherein the operations further comprise activating a resize action wherein each of the first and second selection areas is returned to an initial size.

3. The computing device of claim 1, wherein the operations further comprise displaying a resize icon on the radially configured user interface.

4. The computing device of claim 1, wherein the operations further comprise activating a second radially configured user interface, the second radially configured user interface having a second set of menu options.

5. The computing device of claim 4, wherein the second radially configured user interface is activated by selecting one of the first selection area or the second selection area.

6. The computing device of claim 5, wherein the operations further comprise selecting one of the second set of menu options via touch input.

7. The computing device of claim 6, wherein selecting one of the first selection area or the second selection area and selecting one of the second set of menu options is provided via a gesture.

8. The computing device of claim 1, wherein:
   the size of the first selection area is bounded by a predetermined maximum percentage of a total available area of the radially configured user interface; and
   the size of the second selection area is bounded by a predetermined minimum percentage of the total available area of the radially configured user interface.

9. A process comprising:
- displaying, via a touch screen of a computing device, a user interface comprising at least a first selection area having a first size and a second selection area having a second size;
- monitoring, at the computing device, a first frequency of user selections of the first selection area and a second frequency of user selections of the second selection area;
- storing the first frequency of user selections of the first selection area and the second frequency of user selections of the second selection area;
- determining that the first frequency of user selections of the first selection area is greater than the second frequency of user selections of the second selection area; and
- increasing the first size of the first selection area within the user interface and decreasing the second size of the second selection area within the user interface based, at least in part, on the first frequency of user selections of the first selection area being greater than the second frequency of user selections of the second selection area.

10. The process of claim 9, wherein the first frequency of user selections of the first selection area is based on menu selections provided at the computing device via touch input.

11. The process of claim 9, further comprising activating a second user interface, the second user interface comprising a set of menu options, wherein the second user interface is activated by selecting one of the first selection area or the second selection area.

12. The process of claim 11, further comprising selecting one of the set of menu options, wherein selecting one of the first selection area or the second selection area and selecting one of the set of menu options is provided via a gesture.

13. One or more computer-readable media storing computer-executable instructions that, when executed by a processor, perform the process of claim 9.

14. The process of claim 9, wherein:
- the first size of the first selection area is bounded by a predetermined maximum percentage of a total available area of the user interface; and
- the second size of the second selection area is bounded by a predetermined minimum percentage of the total available area of the user interface.

15. One or more computer-readable media storing computer-executable instructions that, when executed by a processor, perform operations comprising:
- displaying, at a computing device, a user interface comprising at least a first selection area having a first size and a second selection area having a second size;
- monitoring, at the computing device, use of the first selection area and use of the second selection area, the use of the first selection area and the use of the second selection area being personal to a user associated with the computing device;
- determining that a first frequency of use of the first selection area is greater than a second frequency of use of the second selection area; and
- adjusting the first size to a third size and the second size to a fourth size based, at least in part, on the first frequency of use of the first selection area being greater than the second frequency of use of the second selection area, wherein adjusting the first size to the third size and the second size to the fourth size comprises:
  - increasing coverage of the first selection area within the user interface while maintaining a total size of the user interface; and
  - decreasing coverage of the second selection area within the user interface while maintaining the total size of the user interface.

16. The one or more computer-readable media of claim 15, wherein the use of the first selection area is based on menu selections provided via touch input at the computing device.

17. The one or more computer-readable media of claim 15, wherein:
- the third size of the first selection area is bounded by a predetermined maximum percentage of a total available area of the user interface; and
- the fourth size of the second selection area is bounded by a predetermined minimum percentage of the total available area of the user interface.

* * * * *